(12) United States Patent
Mullin

(10) Patent No.: US 9,379,659 B2
(45) Date of Patent: Jun. 28, 2016

(54) LOSSLESS SNUBBER DRIVE FOR A PERMANENT MAGNET SYNCHRONOUS MOTOR

(75) Inventor: Paul S. Mullin, Yellow Springs, OH (US)

(73) Assignee: Regal Beloit America, Inc., Beloit, WI (US)

( * ) Notice: Subject to any disclaimer, the term of this patent is extended or adjusted under 35 U.S.C. 154(b) by 416 days.

(21) Appl. No.: 13/884,036

(22) PCT Filed: Nov. 8, 2011

(86) PCT No.: PCT/US2011/059706
§ 371 (c)(1),
(2), (4) Date: May 16, 2013

(87) PCT Pub. No.: WO2012/064693
PCT Pub. Date: May 18, 2012

(65) Prior Publication Data
US 2013/0241459 A1 Sep. 19, 2013

Related U.S. Application Data

(60) Provisional application No. 61/513,269, filed on Jul. 29, 2011, provisional application No. 61/411,265, filed on Nov. 8, 2010.

(51) Int. Cl.
*H02P 25/08* (2006.01)
*H02P 6/16* (2006.01)
*H02P 31/00* (2006.01)

(52) U.S. Cl.
CPC ...................................... *H02P 31/00* (2013.01)

(58) Field of Classification Search
CPC ......... H02P 25/083; H02P 6/16; H02P 6/085;
H02P 1/04; H02P 1/28; H02P 27/08; H02P 6/14; H02P 25/022; H02P 25/026; H02P 6/08; H02P 6/182; H02P 7/29
USPC ................. 318/254.1, 254.2, 400.26, 400.32, 318/400.34, 400.35, 701
See application file for complete search history.

(56) References Cited

U.S. PATENT DOCUMENTS 3,649,894 A * 3/1972 Yoneya ...................... H02P 3/20
318/373
3,679,954 A * 7/1972 Hedrick ................... 318/400.04
(Continued)

FOREIGN PATENT DOCUMENTS

GB 2345204 6/2000
WO 2009023206 2/2009

OTHER PUBLICATIONS

Inaba, C.Y. et al, "High-frequency flyback-type soft-switching PWM DC-DC power converter with energy recovery transformer and auxiliary passive lossless snubbers," Graduate Sch. of Sci. & Eng., Yamaguchi Univ., Japan Electric Power Applications, IEE Proceedings—Issue Date: Jan. 9, 2004; 151:1:32-37.

(Continued)

*Primary Examiner* — Bentsu Ro
(74) *Attorney, Agent, or Firm* — Michael Best & Friedrich LLP

(57) ABSTRACT

A loss-less snubber drive for a permanent magnet motor. The motor system includes a first motor phase with a primary winding and an auxiliary winding. A controllable switch is positioned between the primary winding and ground such that current passes through the primary winding to ground when the controllable switch is closed. A capacitor is configured to accumulate charge when the controllable switch is opened. The auxiliary winding is configured such that charge stored by the capacitor causes current to pass through the auxiliary winding when the controllable switch is closed.

19 Claims, 5 Drawing Sheets

(56) References Cited

U.S. PATENT DOCUMENTS

| | | | |
|---|---|---|---|
| 4,409,524 A * | 10/1983 | Nielsen et al. | 318/400.05 |
| 4,851,751 A * | 7/1989 | Gipson | H02P 25/04 318/599 |
| 4,922,169 A * | 5/1990 | Freeman | 318/400.1 |
| 5,260,607 A | 11/1993 | Kinbara | |
| 5,883,795 A | 3/1999 | Farrington | |
| 6,115,271 A | 9/2000 | Mo | |
| 6,140,729 A | 10/2000 | Pollock et al. | |
| 6,314,002 B1 | 11/2001 | Qian et al. | |
| 6,421,255 B1 | 7/2002 | Frebel et al. | |
| 6,473,318 B1 | 10/2002 | Qian et al. | |
| 6,528,964 B2 | 3/2003 | Schulz et al. | |
| 6,798,672 B2 | 9/2004 | Jinno | |
| 7,271,564 B2 | 9/2007 | Ramu | |
| 7,515,439 B2 | 4/2009 | Leu | |
| 7,630,219 B2 | 12/2009 | Lee | |
| 7,852,038 B2 * | 12/2010 | Ramu | 318/701 |
| 2008/0094866 A1 | 4/2008 | Bauman et al. | |

OTHER PUBLICATIONS

Marshall J. et al., "A novel lossless snubber for boost converters," 2006 IEEE International Symposium on Industrial Electronics; Montreal, Que., Canada; Jul. 2006; 1030-5.

Kumar, S. et al., "Decoupled control of salient pole synchronous motor drive," Iranian Journal of Electrical and Computer Engineering, 7:2:147-152, 2008.

PCT/US2011/059706 International Search Report and Written Opinion dated Feb. 21, 2013 (11 pages).

PCT/US2011/059706 International Preliminary Report on Patentability dated May 23, 2013 (7 pages).

* cited by examiner

LOSSLESS SNUBBER DRIVE FOR A PERMANENT MAGNET SYNCHRONOUS MOTOR

RELATED APPLICATIONS

This application is a national stage filing under 35 U.S.C. 371 of International Application No. PCT/US2011/059706 filed Nov. 8, 2011, which claims priority to U.S. Provisional Patent Application No. 61/411,265, filed Nov. 8, 2010 and U.S. Provisional Patent Application No. 61/513,269, filed Jul. 29, 2011, all of which are incorporated herein by reference in their entirety.

BACKGROUND

The present invention relates to a permanent magnet motor system and related circuit for controlling the operation of electric motor systems.

In low cost electronic drive design for motors it is cost advantageous to use a minimum number of power switching devices. In addition it is lowest cost to use only "low side" switching, that is, switches that sink current directly to ground thus not needing expensive gate drive circuits.

In consequent pole PM machines this architecture often creates an issue with the inactive winding. The motor acts as a transformer so the potential exists for the inactive winding to conduct current and create negative torque (losses). To date the only solution for this issue is to use a single top side switch with gate driver circuit negatively affecting system cost. Another alternative is to only use bottom side switches and change the traditional diode flyback clamp to an RC type (the diode clamp will allow inactive winding current resulting in low efficiency). An RC type snubber circuit prevents dc current in the inactive winding while replacing the diode in its role as flyback protector for the switch. However, with this approach much of the energy captured by the flyback RC snubber is dissipated as heat—again, energy losses.

SUMMARY

What is needed is a low cost snubber that does not result in significant losses and does not allow dc current in the inactive winding.

One embodiment of the invention includes a system that applies "loss-less snubber" concepts to electric motors. The lossless snubber stores the flyback energy in a capacitor, but instead of dissipating it into a resistor it is provided to a second winding producing positive torque.

Other embodiments of the invention include a power supply that includes a rectifier configured in a parallel-type arrangement with a first capacitor and a second capacitor to provide a DC bus to power the windings of the motor. Still other embodiments include a three-terminal Hall-effect sensor that monitors the position of the permanent magnet and operates the motor-winding switches accordingly. Alternatively, some "sensorless" embodiments monitor a back emf waveform induced on the inactive winding to control the motor-winding switches without the use of a Hall-effect sensor.

In some embodiments, the motor system includes a current limit circuit that monitors a current through the motor windings and changes the state of the switches when the current exceeds a threshold thereby controlling the switches at a variable frequency as determined by variable motor parameters such as inductances, motor speed, and back emf. Some embodiments use the current limit circuit to control a two-phase motor where each phase includes a main and an auxiliary winding. The current on the auxiliary winding is not monitored by the current limit circuit.

In another embodiment, the invention provides a multi-phase electric motor system including a first motor phase with a primary winding and an auxiliary winding. A controllable switch is positioned between the primary winding and ground such that current passes through the primary winding to ground when the controllable switch is closed. A capacitor is configured to accumulate charge when the controllable switch is opened. The auxiliary winding is configured such that charge stored by the capacitor causes current to pass through the auxiliary winding when the controllable switch is closed.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
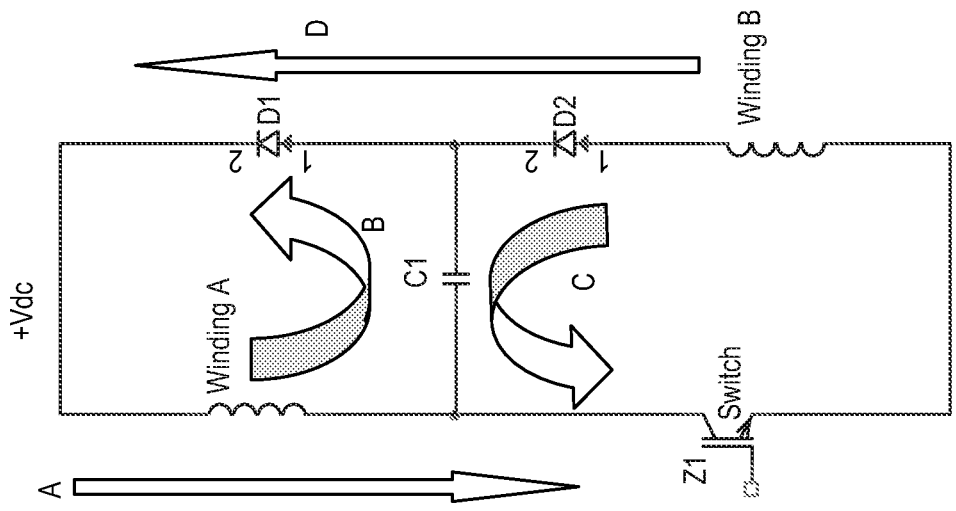
FIG. 1 is a schematic diagram of a snubber circuit for an electric motor.

FIG. 1 shows a circuit diagram for one phase of the lossless snubber drive circuit. A second similar circuit would be included in a two-phase wound electric motor. The arrows show three discrete current flows, labeled A, B and C. When switch Z1 is turned on current flows from the power supply through the main winding A to the return producing torque. When the switch turns off current in the inductor is diverted via current path B through C1 and D1. The energy stored in the inductor is transferred to capacitor C1 with low loss. During the next PWM pulse, when Z1 turns on both currents A and C will flow. Current A again is producing torque with the main power supply as the source. Current C flows with C1 as the source through winding B. Winding B is a separate winding on the same phase as A that is arranged to produce positive torque. In this way the flyback energy from winding A is not wasted, but, instead, is applied to the motor winding B when the switch Z1 is closed. In addition this circuit requires only a few low cost components.

Two of these circuits will be present in the two phase 3.3" motor drive design. The capacitor C1 will block dc currents from flowing when the phase is inactive.

Described above is a sequence of discrete current flows. If the switching frequency is kept relatively low or even to the extreme of only one switching event per commutation cycle discrete current flows are perfectly acceptable. To keep the frequency low the motor is wound with high inductance and high resistance (lots of turns of small wire). This tends to increase motor losses (I-squared R losses) significantly in small motors. A low resistance, low inductance motor can be more efficient, but then the switching frequency is increased to control current flow in the motor. A high switching frequency with discontinuous current flow causes high frequency losses in the motor (current ripple is large at the switching frequency). It is desirable to use a low resistance motor, switch at high frequency controlling the current but keep current continuous in the windings with as little current ripple as possible.

Figure 2:
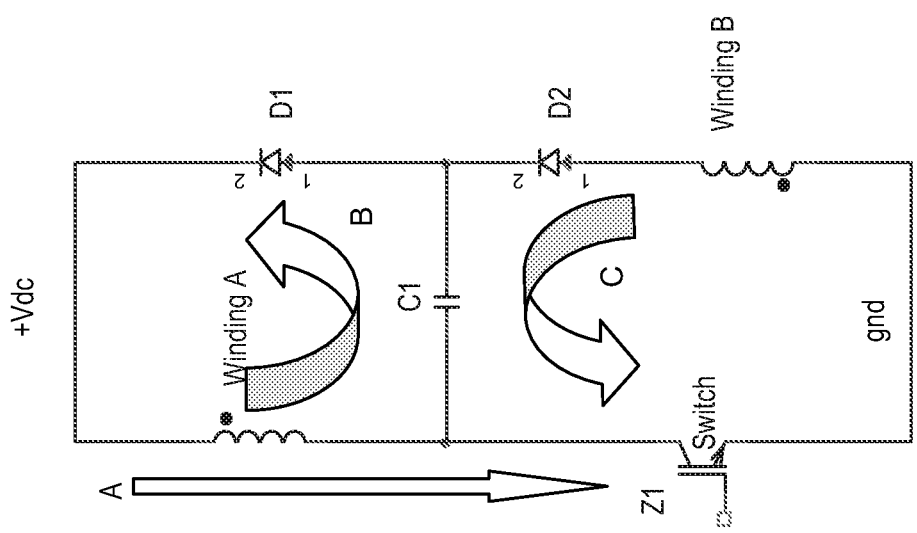
FIG. 2 is a schematic diagram of another snubber circuit.

As shown in FIG. 2, this is possible with the same circuit described above. When the switching frequency, motor windings and capacitor C1 value are matched appropriately continuous current flow in the main and auxiliary winding can be achieved. When switch Z1 is on currents A and C flow, when the switch is off currents B and D flow. Switch fast enough and current in both windings is continuous.

One embodiment uses a shunt resistor and implements a current limit in the path from Z1 to ground as described in further detail below. Z1 turns off when the current grows to a pre-set level and back on after a predetermined time. In this fashion continuous currents are realized in a 50-watt, two-phase motor where both phases were split into even main and auxiliary coils. Switching frequency ranged from 15 to 25 KHz.

Figure 3:
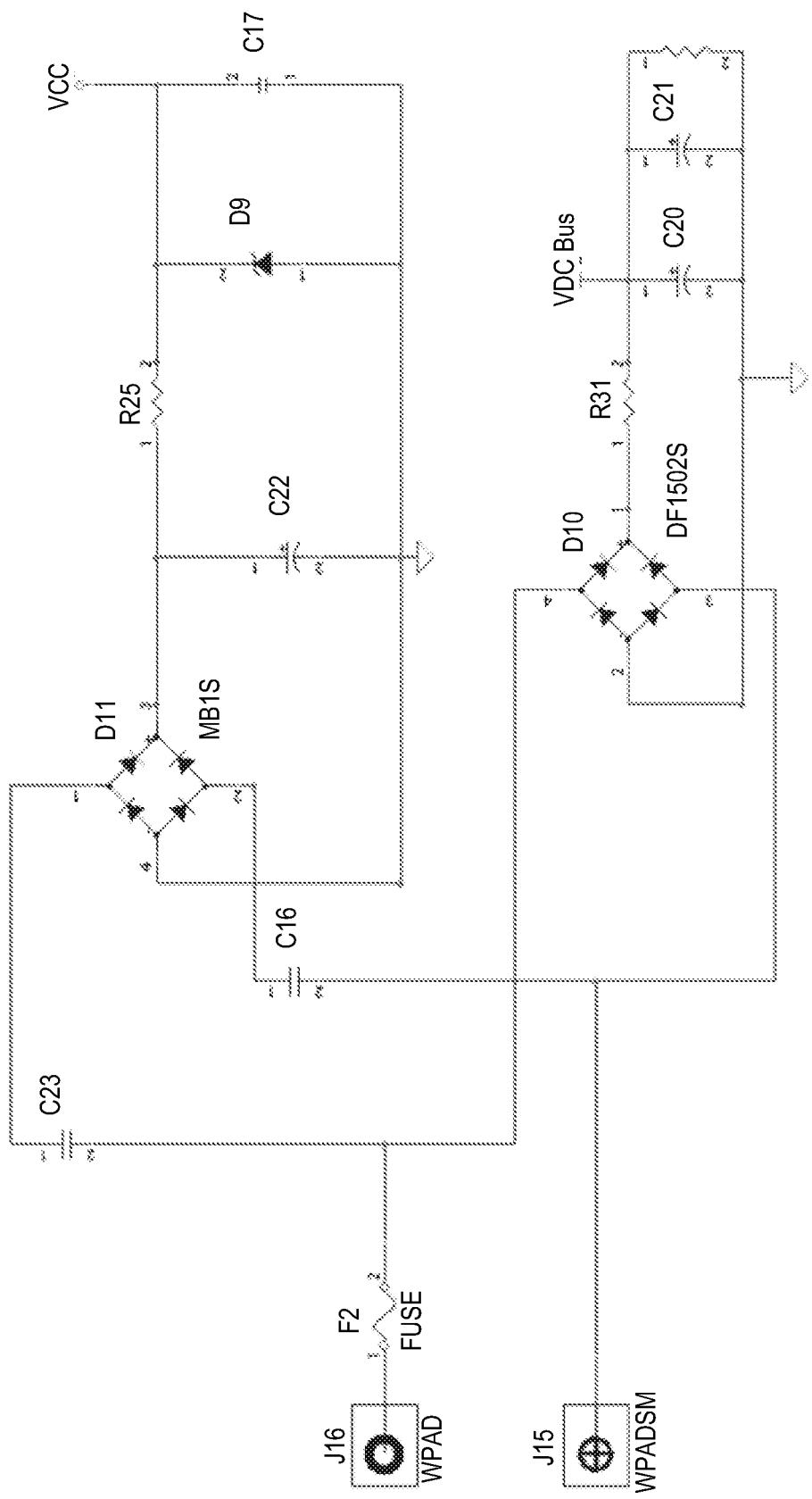
FIG. 3 is a schematic diagram of a power supply circuit for an electric motor.

FIG. 3 illustrates a power supply circuit for a motor system that may include the snubber circuits described above. The power supply circuit provides a DC bus to power the motor windings. An AC line input is provided at J15 and J16. A rectifier D10 and capacitors C20 and C21 provide the DC bus.

Figure 4:
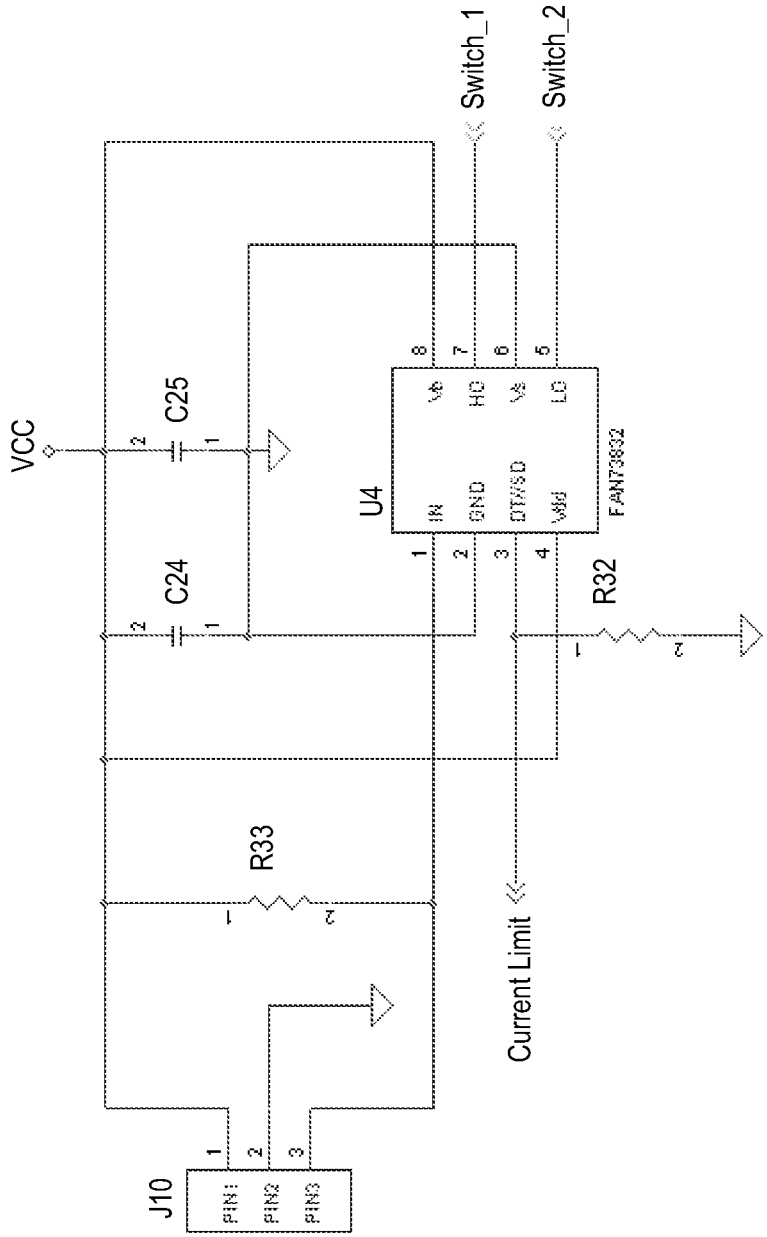
FIG. 4 is a schematic diagram of a Hall-effect sensor-based control system for an electric motor.

FIG. 4 illustrates a control circuit for switching the motor windings that includes a Hall-effect sensor. The Hall-effect sensor J10 includes three terminals and provides a digital output to the controller U4. The controller U4 monitors the output of the Hall-effect sensor to control which switch is activated (switch_1 or switch_2). The Hall-effect sensor is positioned in the motor to affect switching at the transition between the phases or can be shifted physically to provide the equivalent of phase advance to the operation of the motor.

In other embodiments, the position of the permanent magnet rotor is monitored without the use of a Hall-effect sensor. Instead the inactive phase is monitored for a back EMF induced on the windings by the movement of the magnet. The back EMF waveform is analyzed to determine the appropriate commutation time. The switches (switch_1 and switch_2) are opened and closed accordingly.

Figure 5:
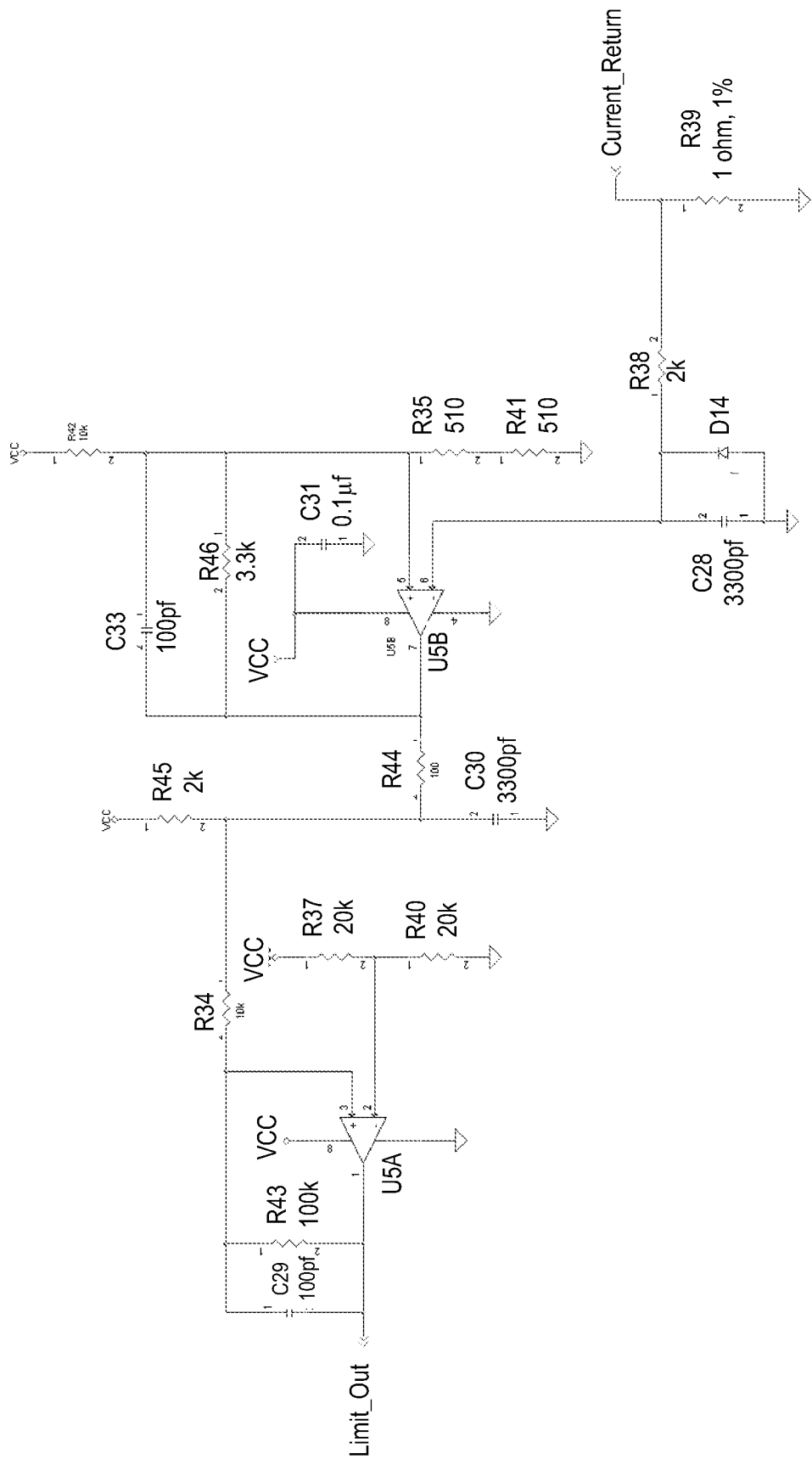
FIG. 5 is a schematic diagram of a current-limit circuit for controlling an electric motor.

FIG. 5 illustrates another circuit for controlling the operation of the motor windings based on the current that flows through the windings. Current returning from the main motor windings (phase A or B) flows through resistor R39 to ground. Resistor R39 has a small resistance (e.g., 1 ohm) to provide current detection. Comparator U5B changes state when the measured current exceeds a threshold value. The threshold value can be pre-set by resistors as shown or adjustable via analog and digital inputs such as those provided by a microcontroller.

When comparator U5B changes state, comparator U4A also changes state and causes the power switches to be turned off. Current immediately stops flowing in R39 and the output of U5B returns to its normal state. The R-C values of resistor R45 and capacitor C30 are set to hold the output of U5A in the limit state for a pre-determined amount of time. In this way, the circuit has a fixed current off-time. When the off-time expires, current is switched on and again builds to the threshold. Because the current on the motor windings is affected by variables such as inductance of the motor, the motor speed, and back EMF on the inactive motor windings, the circuit is able to provide current to the motor windings at a variable frequency determined by variable motor parameters and a fixed circuit off-time.

In some embodiments, the control circuit illustrated in FIG. 5 is replaced by a microcontroller using an analog-to-digital converter or an internal comparator. In such embodiments, the current off-time can be controlled by programmed computer instructions.

Figure 6:
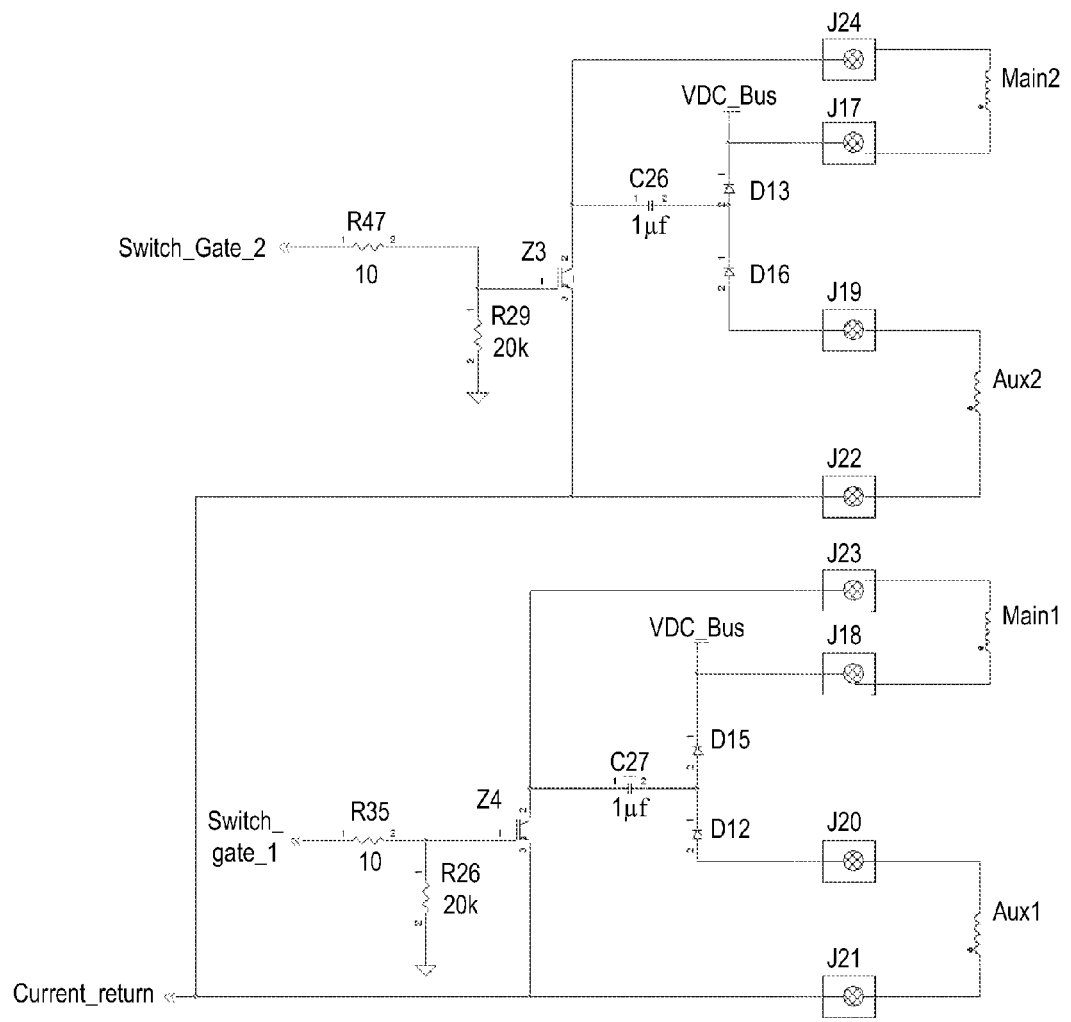
FIG. 6 is a schematic diagram of a two-phase motor winding system.

FIG. 6 illustrates one such motor control circuit that is operated using the current limit circuit described above. The motor system includes two phases—phase 1 and phase 2. Each phase includes a main winding and an auxiliary winding. When the phase power switch (switch Z3 or Z4, respectively) is "on," current flows through the main winding to the current return (current_return). The current return is monitored by the current limit circuit. Current flowing through the auxiliary winding is provided by a capacitor (C26 or C27, respectively). It does not flow through the current limit circuit and, therefore, does not contribute to the current limit function described above. This allows the current in the main winding to be regulated (or "chopped") at a steady level regardless of activity on the auxiliary winding.

In other embodiments that include both a main and auxiliary winding, the current limit circuit monitors bulk (or total) current provided by both the main and auxiliary windings. However, due to the more constant current levels, the circuit of FIG. 6 is more efficient.

The construction of the motor windings can also be manipulated to affect the performance of the motor. In one motor configuration, the motor includes two mechanical poles and only two teeth. Each tooth is wound with a main and auxiliary winding. When one tooth is being driven (e.g., current is provided to the tooth by closing the corresponding switch), the other tooth operates as the opposite or "consequent" pole. As such, when current is driven in phase 1 of the motor, tooth 1 becomes a north magnetic pole and tooth 2 becomes magnetic south even though there is not current in the winding of tooth 2. When the switches are reversed, current is provided to tooth 2, which becomes the north magnetic pole, and tooth 1 becomes the consequent south.

Other embodiments of the motor system include more mechanical poles—for example, four poles and two coils on each tooth. In such motors, opposite mechanical poles are connected in series so that there are still only two electrical poles.

In yet another example, the main and auxiliary windings are separated. The motor includes a six-pole stator where each tooth is wound with a single coil of wire. Each phase consists of two teeth wired in series to form a main winding. The third tooth opposite from the main is a single coil used as an auxiliary winding for the phase. Similar arrangements can be used to other numbers of mechanical poles. This arrangement provides simplified windings, but may provide some magnetic imbalance that could lead to side-pull or noise.

The construction of the motor can also be configured to optimize the operation and direction of the motor when it is started. Simple electric motors only create two magnetic vectors. These vectors are electrically 180 degrees apart and form a switching magnetic field. Such motors are incapable of reliable starting rotation direction. Several features can be included in the motor to provide more consistent rotation direction at start-up such as a tapered air gap, a skewed magnetic pattern, or Hall-effect sensor advance/mechanical placement of the rotor.

In some constructions of the invention, a one of the windings of the motor is shifted to create rotation in the magnetic vector to ensure a consistent direction of rotation at start-up. One construction includes a 36-slot stator where each pole is wound using four slots. Each pole shares the two end slots with the adjacent pole to make a 12-pole stator. The main windings of phase 1 and phase 2 are laid in the stator sharing end slots. The auxiliary winding, instead of being positioned directly on top of the main coils, is shifted one tooth either clockwise or counter-clockwise. The drive naturally builds current in the main winding first before current flows in the auxiliary winding. By first energizing the main winding followed by energizing both the main and auxiliary winding, the motor will create a small magnetic rotation at each commutation. This ensures a consistent rotation direction at start-up without additional components.

In some constructions, the main and auxiliary windings have the same number of turns to ensure that they have similar inductances. Ensuring that the main and auxiliary winding have similar inductance will reduce switching frequency ripple and associated power losses. However, the auxiliary winding in some of the examples described above will carry less current than the main winding. In such systems, to improve efficiency of the system, the auxiliary winding is constructed using a smaller gauge wire than the main winding.

In other systems that use higher switching frequencies, the current on the main and auxiliary winding will be more equalized. In such systems, the gauge of the motor windings wires are selected accordingly to prevent switching losses. Furthermore, high switching frequencies may require the use of MOSFETs instead of IGBTs as shown in the circuit diagrams above.

Thus, the invention provides, among other things, a lossless snubber for a permanent magnet electric motor and additional circuits for the control of such motors. Various features and advantages of the invention are set forth in the following claims.

What is claimed is:

1. A multi-phase electric motor system, comprising:
   a first motor phase including
      a primary winding,
      an auxiliary winding,
      a controllable switch having a collector terminal and an emitter terminal and positioned between the primary winding and ground such that current passes through the primary winding to ground when the controllable switch is closed, and
      a capacitor electrically connected between the collector terminal of the controllable switch and the auxiliary winding and configured to
         accumulate charge when the controllable switch is opened, and
         cause current to pass through the auxiliary winding when the controllable switch is closed; and
   a second motor phase including
      a second primary winding,
      a second auxiliary winding,
      a second controllable switch having a second collector terminal and a second emitter terminal and positioned between the second primary winding and ground such that current passes through the second primary winding to ground when the second controllable switch is closed, and
      a second capacitor electrically connected between the second collector terminal of the second controllable switch and the second auxiliary winding and configured to
         accumulate charge when the second controllable switch is opened, and
         cause current to pass through the second auxiliary winding when the second controllable switch is closed.

2. The multi-phase electric motor system of claim 1, further comprising a diode electrically connected between the capacitor and the auxiliary winding, the diode is oriented so as to prevent the current from the primary winding from flowing through the auxiliary winding when the controllable switch is open.

3. The multi-phase electric motor system of claim 2, further comprising a third diode electrically connected between the capacitor and a voltage source, the third diode is oriented so as to prevent a current from the voltage source from flowing through the capacitor.

4. The multi-phase electric motor system of claim 1, further comprising a second diode electrically connected between the second capacitor and the second auxiliary winding, the second diode is oriented so as to prevent the current from the second primary winding from flowing through the second auxiliary winding when the second controllable switch is open.

5. The multi-phase electric motor system of claim 4, further comprising a fourth diode electrically connected between the second capacitor and a voltage source, wherein the fourth diode is oriented so as to prevent a current from the voltage source from flowing through the second capacitor.

6. A multi-phase electric motor system comprising:
   a first motor phase including
      a primary winding,
      an auxiliary winding,
      a controllable switch having a collector terminal and an emitter terminal and positioned between the primary winding and ground such that current passes through the primary winding to ground when the controllable switch is closed, and
      a capacitor electrically connected between the collector terminal of the controllable switch and the auxiliary winding and configured to
         accumulate charge when the controllable switch is opened, and
         cause current to pass through the auxiliary winding when the controllable switch is closed;
   a permanent magnet rotor;
   a Hall-effect sensor positioned to detect a position of the permanent magnet rotor; and
   a controller configured to
      determine the position of the permanent magnet rotor based on a signal received from the Hall-effect sensor, and
      alternatingly open and close the controllable switch based at least in part on the position of the permanent magnet rotor.

7. A multi-phase electric motor system comprising:
   a first motor phase including
      a primary winding,
      an auxiliary winding,
      a controllable switch having a collector terminal and an emitter terminal and positioned between the primary winding and ground such that current passes through the primary winding to ground when the controllable switch is closed, and
      a capacitor electrically connected between the collector terminal of the controllable switch and the auxiliary winding and configured to
         accumulate charge when the controllable switch is opened, and
         cause current to pass through the auxiliary winding when the controllable switch is closed;

a permanent magnet rotor;
a second motor phase, wherein one of the first motor phase and the second motor phase is inactive when the other is active, and wherein the first motor phase is active when the controllable switch is closed and inactive when the controllable switch is opened; and
a controller configured to
monitor a back EMF induced on the inactive phase, and
change the inactive phase to the active phase based on the monitored back EMF.

8. A multi-phase electric motor system comprising:
a first motor phase including
a primary winding,
an auxiliary winding,
a controllable switch having a collector terminal and an emitter terminal and positioned between the primary winding and ground such that current passes through the primary, winding to ground when the controllable switch is closed, and
a capacitor electrically connected between the collector terminal of the controllable switch and the auxiliary winding and configured to
accumulate charge when the controllable switch is opened, and
cause current to pass through the auxiliary winding when the controllable switch is closed; and
a control circuit configured to
monitor a current return from the motor phases to ground, and
change the state of the controllable switch when the current return exceeds a threshold current.

9. The multi-phase electric motor system of claim 8, wherein the control circuit includes a comparator configured to compare the current return to a reference current provided by a reference circuit.

10. The multi-phase electric motor system of claim 8, wherein the control circuit includes a controller including an analog-to-digital converter, and wherein the controller determines a current value of the current return based on the output of the analog-to-digital converter and changes the state of the controllable switch if the current value exceeds a threshold current value.

11. A multi-phase electric motor system, comprising:
a first motor phase including
a primary winding,
a controllable switch positioned between the primary winding and ground such that current passes through the primary winding to ground when the controllable switch is closed,
a capacitor electrically connected to the primary winding and configured to accumulate charge when the controllable switch is opened,
an auxiliary winding electrically connected between the capacitor and ground such that charge stored by the capacitor causes current to pass through the auxiliary winding when the controllable switch is closed, and
a diode electrically connected between the capacitor and the auxiliary winding, the diode is oriented so as to prevent current from the primary winding from flowing through the auxiliary winding when the controllable switch is opened.

12. The multi-phase electric motor system of claim 11, further comprising:
a second motor phase including
a second primary winding,
a second controllable switch positioned between the second primary winding and ground such that current passes through the second primary winding to ground when the second controllable switch is closed,
a second capacitor electrically connected to the second primary winding and configured to accumulate charge when the second controllable switch is opened,
a second auxiliary winding electrically connected between the second capacitor and ground such that charge stored by the second capacitor causes current to pass through the second auxiliary winding when the second controllable switch is closed, and
a second diode electrically connected between the second capacitor and the second auxiliary winding, the second diode is oriented so as to prevent current from the second primary winding from flowing through the second auxiliary winding when the second controllable switch is opened.

13. The multi-phase electric motor system of claim 12, further comprising a fourth diode electrically connected between the second capacitor and a voltage source, wherein the fourth diode is oriented so as to prevent a current from the voltage source from flowing through the second capacitor.

14. The multi-phase electric motor system of claim 11, further comprising:
a permanent magnet rotor;
a Hall-effect sensor positioned to detect a position of the permanent magnet rotor; and
a controller configured to
determine the position of the permanent magnet rotor based on a signal received from the Hall-effect sensor, and
alternatingly open and close the controllable switch based at least in part on the position of the permanent magnet rotor.

15. The multi-phase electric motor system of claim 11, further comprising:
a permanent magnet rotor;
a second motor phase, wherein one of the first motor phase and the second motor phase is inactive when the other is active, and wherein the first motor phase is active when the controllable switch is closed and inactive when the controllable switch is opened; and
a controller configured to
monitor a back EMF induced on the inactive phase, and
change the inactive phase to the active phase based on the monitored back EMF.

16. The multi-phase electric motor system of claim 11, further comprising a control circuit configured to
monitor a current return from the motor phases to ground, and
change the state of the controllable switch when the current return exceeds a threshold current.

17. The multi-phase electric motor system of claim 16, wherein the control circuit includes a comparator configured to compare the current return to a reference current provided by a reference circuit.

18. The multi-phase electric motor system of claim 16, wherein the control circuit includes a controller including an analog-to-digital converter, and wherein the controller determines a current value of the current return based on the output of the analog-to-digital converter and changes the state of the controllable switch if the current value exceeds a threshold current value.

19. The multi-phase electric motor system of claim 11, further comprising a third diode electrically connected between the capacitor and a voltage source, the third diode is oriented so as to prevent a current from the voltage source from flowing through the capacitor.

* * * * *